(12) United States Patent
Jeon

(10) Patent No.: US 8,304,068 B2
(45) Date of Patent: Nov. 6, 2012

(54) COMPOSITION FOR COATING WIPER BLADE RUBBERS, COATING METHOD USING THE SAME, AND WIPER BLADE RUBBERS MADE THEREFROM

(75) Inventor: Sun Mi Jeon, Ansan-si (KR)

(73) Assignee: ADM21 Co., Ltd., Gyeonggi-do (KR)

( * ) Notice: Subject to any disclaimer, the term of this patent is extended or adjusted under 35 U.S.C. 154(b) by 934 days.

(21) Appl. No.: 12/040,780

(22) Filed: Feb. 29, 2008

(65) Prior Publication Data

US 2009/0047475 A1 Feb. 19, 2009

(30) Foreign Application Priority Data

Aug. 17, 2007 (KR) .................. 10-2007-0083002
Dec. 17, 2007 (KR) .................. 10-2007-0132644

(51) Int. Cl.
*B32B 5/16* (2006.01)
(52) U.S. Cl. ........................ 428/323; 428/327
(58) Field of Classification Search .............. 428/323, 428/327
See application file for complete search history.

(56) References Cited

U.S. PATENT DOCUMENTS

| | | | |
|---|---|---|---|
| 3,948,811 A | 4/1976 | Clary et al. | |
| 4,638,525 A | 1/1987 | Sugita et al. | 15/250.36 |
| 6,120,849 A * | 9/2000 | Smith et al. | 427/372.2 |
| 6,671,922 B1 | 1/2004 | Geilenkirchen et al. | 15/250.48 |
| 2002/0051823 A1 * | 5/2002 | Yan et al. | 424/618 |
| 2002/0160203 A1 * | 10/2002 | Robertson | 428/423.1 |
| 2006/0046047 A1 | 3/2006 | Wilms et al. | |

FOREIGN PATENT DOCUMENTS

| | | |
|---|---|---|
| DE | 3400852 | 7/1985 |
| DE | 3527093 | 7/1985 |
| DE | 19612231 | 10/1997 |
| EP | 562191 A2 * | 9/1993 |
| JP | 5269437 | 10/1993 |
| JP | 08048800 | 2/1996 |
| JP | 09-296136 | 11/1997 |
| JP | 10-001640 | 1/1998 |
| JP | 11-034809 | 2/1999 |
| JP | 11-269437 | 10/1999 |
| JP | 2005-529791 | 10/2005 |
| JP | 08-048800 | 3/2008 |
| KR | 1020050006677 | 1/2005 |
| WO | 99/39948 | 8/1999 |
| WO | WO 02081582 | 10/2002 |
| WO | WO 03/106575 | 12/2003 |

OTHER PUBLICATIONS

Lambourne, Pant and Surface Coatings—Carbon black section, 1987, Ellis Horwood Limited, pp. 150-152.*
International Search Report, dated Aug. 12, 2003, 1 page.

* cited by examiner

Primary Examiner — Elizabeth A Robinson
(74) Attorney, Agent, or Firm — Woodcock Washburn LLP

(57) ABSTRACT

The present invention relates to compositions, which can be used for coating (e.g., painting) wiper blade rubbers to enhance durability, resistance to frictional forces, and/or other properties. In various embodiments, the coating compositions comprise nano-particle PTFE (Teflon®), polyurethane, and silicone resin in a solvent and/or liquid carrier, such as distilled water. The coating compositions may further comprise graphite, a carbon lubricant, and/or a water-based resin. Methods for forming a coating on a wiper blade rubber using the compositions of the invention are also provided.

18 Claims, 8 Drawing Sheets

COMPOSITION FOR COATING WIPER BLADE RUBBERS, COATING METHOD USING THE SAME, AND WIPER BLADE RUBBERS MADE THEREFROM

FIELD OF THE INVENTION

The present invention relates to a coating composition for wiper blade rubbers. In some specific embodiments, Teflon® nano-particle compositions are provided, which impart improvements in durability, resistance to frictional forces, and other properties to coated wiper blade rubbers. Also provided are methods for coating wiper blade rubbers with such compositions, and wiper blade rubbers produced by such methods.

BACKGROUND OF THE INVENTION

Automobile windshield wipers generally comprise strip rubbers attached to a wiper blade, where the blade is attached to a wiper arm. As the wiper arm is translated by a drive apparatus, the strip rubbers slide over the vehicle's windshield to remove moisture (e.g., raindrops, snowflakes), dust, etc., thereby improving visibility. Because the region of a wiper blade which contacts the windshield is generally strip-shaped, wiper blade rubbers are often referred to as strip rubbers or wiper blade rubbers.

Wiper blade rubbers are commonly made of elastic materials, and can be divided into a head portion that is joined to the frame of a wiper blade, and a wedge-shaped portion that contacts the windshield. The wiper head and wedge-shaped portions are assembled in a way that allows them to bend or fold in a direction opposite to wiper movement, due to frictional forces between the windshield and the wiper rubbers. As a result, wiper rubbers can maintain a consistent, uniform cleaning ability, with minimal slippage.

Materials for preparing wiper blade rubbers preferably have not only good mechanical properties, but also satisfy additional requirements related to vehicle safety against external influences. Wiper blade rubber materials should be flexible and be able to slide smoothly over the windshield. Furthermore, blade rubber materials should have resistance to environmental influences, including, for example, oxidation (e.g., ozone cleavage), mineral oil, and chemicals contained, for example, in washing fluid.

Wiper blade rubbers are generally composed of rubbers, such as vulcanized natural rubbers or synthetic rubbers. However, in order to improve the sliding properties of the rubbers, additional treatments have been suggested, such as surface coatings, chlorination, and treatment with sliding powder agents such as molybdenum sulfide.

The wiper blade rubber described in DE-C-35 27 093 preponderantly consists of EPDM (Ethylene-Propylene-Dien-Monomer), which includes unsaturation sites outside the main ring of the polymer. As a result, the EPDM is not halogenated and has low resistance to mineral oil and chemicals contained in washing fluid. Therefore, according to DE-C-35 27 093, in order to improve the sliding properties and the endurance of wiper blades consisting preponderantly of EPDM, chlorinated diene-type rubber segments were placed on a matrix consisting of EPDM in regions that slide over the car windshield during proper use. However, wiper rubbers having such a complex structure, with layers of different rubber materials is disadvantageous.

WO 1999/39948 (Corresponding to Korean Laid-open publication No. 10-2001-0015914) discloses a wiper blade in which different kinds of rubber materials are used for the head and wedge portions of the wiper. The head portion is made of a diene-type rubber that can be halogenated, resulting in favorable sliding properties and smooth operating conditions. Further, the wipers also provide improved access to the connecting region in which the wiper blade cooperates with the supporting strip and the spring rail of the metallic support, as well as a harder surface. Chloroprene rubber (CR) is used for the flexing portion and the wedge portion of the wiper blade, and has excellent mechanical properties with high resistance to environmental conditions, including bad weather, aging, chemicals, and temperature. Therefore, improved wiper quality can be achieved in a simple and inexpensive manner according to said invention. However, chloroprene has certain limitations, including poor resistance to frictional forces which occur between windshield glass and wiper rubbers.

Korean Patent Reg. Publication No. 10-2005-0006677 discloses a windshield wiper blade coating composition and related coating methods. The coating composition comprises graphite and dimethyl silicone oil as essential ingredients, and further comprises a resin selected from polyol resin, urethane resin, fluoro resin having hydroxyl group, epoxy resin and silicone resin, and a solvent. When windshield wiper blades coated with such compositions are operated over a glass windshield, a water-repelling film having high durability is formed on the glass, which decreases operating noise and shaking movements. However, according to the disclosure of said patent, the compositions use an organic solvent selected from methylethyl ketone, toluene, xylene and butyl acetate, and the resins are not limited to water-based resins. Accordingly, the compositions invariably give rise to environmental pollution.

What is needed is a treatment for a wiper blade that provides improved performance and durability while minimizing environmental pollution. The invention is directed to these and other important needs.

SUMMARY OF THE INVENTION

In one aspect, a coating composition is provided for treating a rubber surface, the composition comprising polytetrafluoroethylene (PTFE) particles; polyurethane particles; a silicone resin particles; and at least one solvent and/or liquid carrier, wherein particles have a mean particle size of about 50 to 500 nm. In preferred embodiments, said compositions are provided for treating wiper blade rubbers. Advantageously, treating wiper blade rubbers with compositions provided herein results in wiper blades with improved performance, durability, and other characteristics.

In various embodiments of compositions provided herein, PTFE is present in the range of 3.5 to 15 wt %; polyurethane is present in the range of 3.2 to 9.6 wt %; and/or silicone resin is present in the range of 1.6 to 6.0 wt %. In various preferred embodiments, PTFE is present in the range of 7 to 8 wt %; polyurethane is present in the range of 5 to 7 wt %; and/or silicone resin is present in the range of 2 to 3 wt %.

In various preferred embodiments, PTFE used in composition provided herein has a mean particle size of about 250-350 nm, or more preferably about 300 nm.

In various preferred embodiments, polyurethane and/or silicone resin used in composition provided herein have a mean particle size of 350 to 450 nm, or more preferably about 400 nm.

In some embodiments, compositions provided herein further comprise a water-based resin having a mean particle size of 50 to 500 nm. In some embodiments, the water-based resin is present in the range of 5 to 25 wt %. In certain embodiments, compositions provided herein comprise 3.5 to 15 wt % of PTFE, 3.2 to 9.6 wt % of polyurethane, 1.6 to 6.0 wt % of silicone resin, and 5 to 25 wt % of a water-based resin.

In some embodiments, compositions provided herein further comprise graphite or carbon black having a mean particle size of 50 to 500 nm. In some embodiments, the graphite or carbon black is present in the range of 3.5 to 15 wt %. In certain embodiments, compositions provided herein comprise 3.5 to 15 wt % of PTFE, 3.2 to 9.6 wt % of polyurethane, 1.6 to 6.0 wt % of silicone resin, and 3.5 to 15 wt % of graphite or carbon black.

In some embodiments, compositions provided herein further comprise silver having a mean particle size of 50 to 500 nm. In some embodiments, the silver is present in the range of 0.16 to 0.5 wt %. In certain embodiments, compositions provided herein comprise 3.5 to 15 wt % of PTFE, 3.2 to 9.6 wt % of polyurethane, 1.6 to 6.0 wt % of silicone resin, 3.5 to 15 wt % of graphite or carbon black, and 0.16 to 0.5 wt % of silver. In other embodiments, compositions provided herein comprise 3.5 to 15 wt % of PTFE, 3.2 to 9.6 wt % of polyurethane, 1.6 to 6.0 wt % of silicone resin, and 0.16 to 0.5 wt % of silver.

In some embodiments, the solvent and/or liquid carrier used in compositions provided herein is an aqueous solvent and/or liquid carrier, and preferably a non-toxic, environmentally friendly solvent and/or liquid carrier. In some preferred embodiments, the solvent and/or liquid carrier is distilled water.

In various embodiments, the silicone resin used in compositions provided herein is polyhydromonomethylsiloxane oil or resin, and/or the water-based resin used in compositions provided herein is urethane resin.

In additional aspects, methods are provided herein for treating the surface of a wiper blade, comprising coating a wiper blade rubber with a coating composition comprising polytetrafluoroethylene (PTFE) particles, polyurethane particles, silicone resin particles, and at least one solvent and/or liquid carrier, wherein said particles have a mean particle size of about 50 to 500 nm. In further aspects, wiper blade rubbers and wiper blades made according to said methods are provided.

In some preferred embodiments, the coating step comprises spraying the composition on a wiper blade rubber to form a coating thereon. In further embodiments, methods provided herein further comprise a step of heating a wiper blade rubber to a temperature of 60 to 100° C. In some preferred embodiments, a wiper blade rubber is pre-heated to a temperature of 60 to 100° C., and then coated with a composition described herein, for example by spray-coating. In certain embodiments, methods provided herein further comprise a step of pre-treating a surface of a wiper blade rubber prior to heating and/or coating the wiper blade rubber with a composition described herein.

In some embodiments, wiper blade rubbers used in methods provided herein comprise natural rubber, butadiene rubber, styrene-butadiene rubber, EPDM rubber, chloroprene rubber, or silicone rubber.

In further aspects, an article is provided comprising a substrate coated with the dried coating composition, said coating composition comprising polytetrafluoroethylene (PTFE) particles, polyurethane particles, silicone resin particles, and at least one solvent and/or liquid carrier, wherein said particles have a mean particle size of about 50 to 500 nm. In additional aspects, the substrate comprising said article is a wiper blade rubber or a wiper blade.

DETAILED DESCRIPTION OF ILLUSTRATIVE EMBODIMENTS

Figure 1:
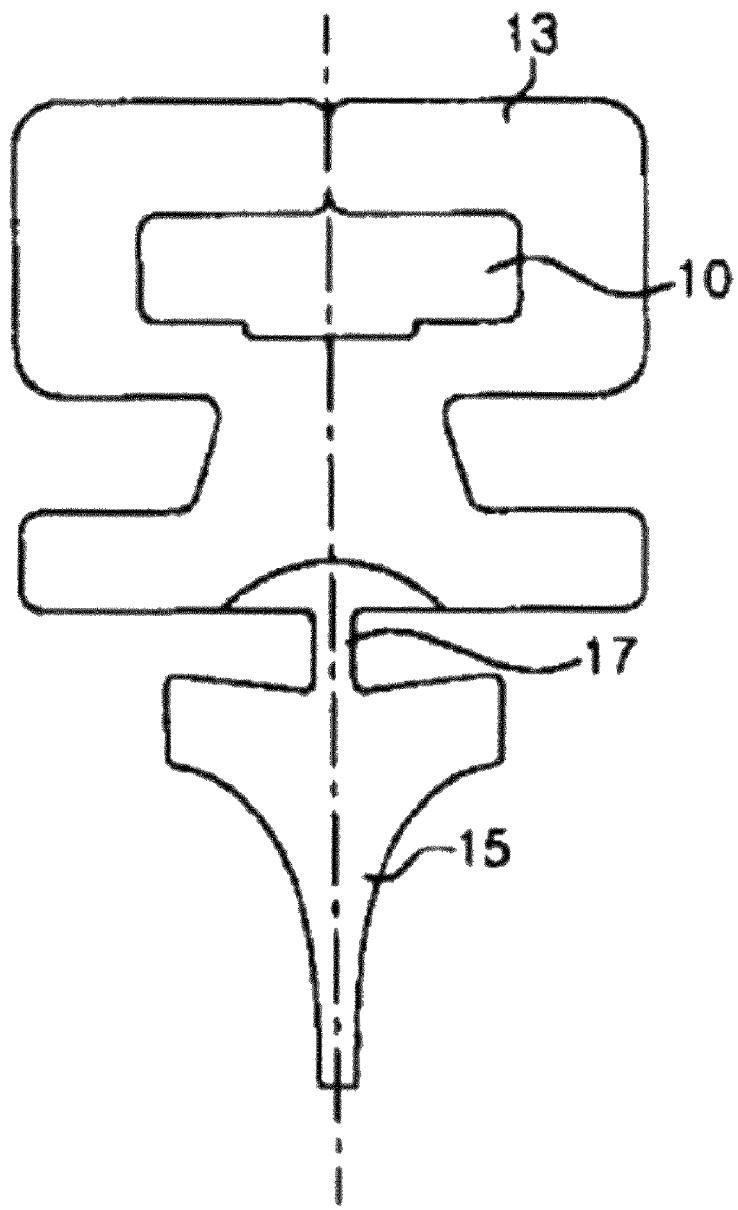
FIG. 1 shows a cross-section of conventional wiper blade rubbers in which a head portion having an internal spring rail is coupled to a wedge portion contacting the surface of the windshield glass via a flexible bridge.

Environmentally-friendly Teflon® coating compositions are provided herein that are useful for coating wiper blade rubbers. The terms "blade rubbers" and "strip rubbers" are used interchangeably herein to refer to the rubber strip-like portion of a wiper blade that contacts the windshield. Advantageously, treating wiper blade rubbers with a composition described herein results in wiper blade rubbers with improved properties and/or performance relative to untreated wiper blade rubbers. For example, in various embodiments, wiper blade rubbers treated with a composition provided herein show improved durability, resistance to environmental conditions, such as inclement weather, chemical agents, extreme temperatures (high and/or low temperatures), temperature fluctuations, and the like, prolonged lifespan, enhanced reliability, and/or improved performance, including, e.g., enhanced resistance to frictional forces.

In some preferred embodiments, wiper blade rubbers treated with a composition provided herein have a reduced frictional coefficient with a windshield surface, relative to untreated wiper blade rubbers. For example, in some embodiments, treatment with a composition provided herein decreases the frictional coefficient of a wiper blade rubber with a glass windshield by at least about 10%, 15%, 20%, 25%, 35%, 50%, 75%, or more relative to untreated wiper blade rubbers.

In some embodiments, compositions provided herein are capable of forming a coating on a wiper blade rubber, wherein the coating has one or more improved properties relative to known coating agents. For example, in various embodiments, compositions provided herein are capable of forming coatings that have enhanced uniformity, durability, water-repellency (extent and/or duration), and/or other properties relative to coatings formed by known compositions, including, e.g., the coating compositions disclosed in Korean Patent Reg. Publication No. 10-2005-0006677.

In various preferred embodiments, compositions provided herein for coating wiper blade rubbers comprise nano-size particles. For example, in some embodiments, compositions provided herein comprise particles having a mean particle size of 50 to 500 nm. In some preferred embodiments, compositions provided herein comprise particles having a mean particle size that is substantially smaller than the particles used in conventional coating compositions. For example, in various embodiments, compositions provided herein comprise particles having a mean particle size that is at least about 10%, 15%, 20%, 25%, 35%, 50%, or 75% less than the mean particle size of known compositions.

In various embodiments, compositions provided herein for coating wiper blade rubbers comprise Teflon® (polytetrafluoroethylene (PTFE)), polyurethane, a silicone resin, and a solvent and/or liquid carrier, each having a mean particle size of 50 to 500 nm. In some preferred embodiments, compositions provided herein comprise 3.5 to 15 wt % of the PTFE, 3.2 to 9.6 wt % of the polyurethane, and 1.6 to 6.0 wt % of the silicone resin, and 5 to 25 wt % of the solvent and/or liquid carrier.

Teflon® is a tradename for polytetrafluoroethylene (PTFE), which is a synthetic fluororesin. As a crystalline resin, PTFE is highly heat-resistant and has a number of additional desirable properties, including but not limited to, chemical-resistance, electric insulation, non-stickiness, and a low frictional coefficient. PTFE is a crystalline polymer having melting temperature of 327° C., a continuous use temperature of 260° C., and stability at a wide range of temperatures, including low (e.g., −268° C.) to high (e.g., 260° C.) temperatures.

Teflon® has excellent chemical resistance relative to other organic materials, and is not substantially degraded by acid or alkali conditions, and is tolerant of various solvents and carriers. PTFE is only degraded under extreme conditions or particular chemical species, such as fluorine gas and molten alkaline metals. Because of these properties, PTFE is widely used for preparing gaskets, packing materials, sealants, and the like. PTFE also has advantageous mechanical properties, is commonly used as a reinforcement material for various fillers. A particularly beneficial property of PTFE is its low frictional coefficient, which gives it a high degree of non-stickiness and makes it useful as a coating on frying pans, steel pipes, and other structures.

Without being bound by a particular theory, it is believed that the above-described physicochemical and mechanical properties of PTFE impart one or more beneficial properties to wiper blade rubbers coated with a composition provided herein, relative to the properties of wiper blade rubbers that are untreated and/or treated with a known composition. For example, in various embodiments, wiper blade rubbers coated with a composition provided herein have enhanced durability, resistance to environmental conditions, including, for example, inclement weather, aging, chemical agents, and temperature (e.g., extreme temperatures and/or temperature changes), and/or resistance to frictional forces (e.g., between the wiper blade rubbers and glass).

In various embodiments, compositions provided herein comprise 3.5 to 15 wt %, and preferably 7 to 8 wt %, PTFE, wherein the PTFE. Without being bound by a particular theory, it is believed that when wiper blade rubbers are coated with compositions comprising PTFE in amounts outside this range, the wiper blade rubbers do not display, or display to a lesser degree, one or more of the beneficial properties imparted by compositions comprising PTFE within the disclosed range.

In some preferred embodiments, PTFE used in compositions provided herein has a mean particle size of 50 to 500 nm, and preferably about 250 to 350 nm, and more preferably about 300 nm.

In various embodiments, the polyurethane used in compositions provided herein is a synthetic polymer compound having urethane linkages inside main chains of the polymer, and can be obtained by a polyaddition reaction by which urethane linkages are repeatedly formed between diisocyanate and dialcohol. Any commercially available, water-soluble polyurethane can be used in compositions described herein.

In various embodiments, compositions provided herein comprise 3.2 to 9.6 wt %, and preferably 5 to 7 wt %, polyurethane. Without being bound by a particular theory, it is believed that when wiper blade rubbers are coated with compositions comprising polyurethane in amounts outside this range, the wiper blade rubbers do not display, or display to a lesser degree, one or more of the beneficial properties imparted by compositions comprising polyurethane within the disclosed range.

In various embodiments, the silicone resin used in compositions provided herein is a polymer of organic derivatives of silicone, and is also referred to as silicon resin. A wide variety of commercially available silicone resins can be used in compositions described herein. The molecular structure of silicone resins used in compositions provided herein preferably includes a silicon skeleton having siloxane linkage (Si—O linkage), wherein silicon atoms alternate with oxygen atoms and functional groups such as methyl groups, phenyl groups, and/or hydroxy groups attached to the silicon atom. In some preferred embodiments, the silicone resin is polyhydromonomethylsiloxane oil or resin.

In some embodiments, the silicone resin is a thermoplastic synthetic resin having a defoaming activity in most commonly used solvents and carriers, and water-repellency (water-resisting activity) when applied to inorganic or organic materials. Without being bound by a particular theory, it is believed that these properties of the silicone resin impart one or more beneficial properties to wiper blade rubbers coated with a composition provided herein, relative to the properties of wiper blade rubbers that are untreated and/or treated with a known composition.

In various embodiments, compositions provided herein comprise 1.6 to 6.0 wt %, and preferably 2 to 3 wt %, of a silicone resin. Without being bound by a particular theory, it is believed that when wiper blade rubbers are coated with compositions comprising a silicone resin in amounts outside this range, the wiper blade rubbers do not display, or display to a lesser degree, one or more of the beneficial properties imparted by compositions comprising a silicone resin within the disclosed range. For example, in compositions comprising a silicone resin in an amount more than 6 wt % or less than 1.6 wt %, a white coat phenomenon may occur, interfering with and/or preventing use of the composition as a coating for wiper blade rubbers.

It some embodiments, the solvent and/or liquid carrier of various compositions provided herein is an aqueous solvent and/or liquid carrier, with distilled water being preferred. In other embodiments, the solvent and/or liquid carrier is an organic solvent and/or liquid carrier or a non-aqueous solvent and/or liquid carrier that is environmentally friendly (e.g., non-toxic, biodegradable, etc.). In some embodiments, where distilled water is unable to quickly dissolve the above-described components, a mixture comprising distilled water and a small amount of lacquer thinner can be used. Lacquer thinner is a mixed solvent and/or liquid carrier that is commercially available and generally used in the pertinent art, for example to lower the viscosity of a paint when it is actually applied.

In some embodiments, compositions provided herein further comprise, in addition to the PTFE, polyurethane, silicone resin, and solvent and/or liquid carrier, a water-based resin, a silver component, and/or graphite or carbon black, each having a mean particle size of 50 to 500 nm. In some preferred embodiments, compositions provided herein comprise 5.0 to 25.0 wt % of the water-based resin, 0.16 to 0.24 wt % of the silver component, and/or 3.5 to 15 wt % of the graphite or carbon black.

The water-repellency of compositions provided herein may be further enhanced by including, in addition to a silicone resin, a commercially available water-based resin. In various embodiments, the water-based resin imparts additional favorable physicochemical properties other than water-repellency. For example, in some embodiments, compositions provided herein comprise a thermosetting water-based resin, preferably a urethane resin.

In various embodiments, compositions provided herein comprise 5 to 25 wt %, and preferably about 20 wt %, of a water-based resin. Without being bound by a particular theory, it is believed that when wiper blade rubbers are coated with compositions comprising a water-based resin in amounts outside this range, the wiper blade rubbers do not display, or display to a lesser degree, one or more of the beneficial properties imparted by compositions comprising a water-based resin within the disclosed range.

In some embodiments, compositions provided herein comprise graphite or carbon black. Without being bound by a particular theory, it is believed that graphite and carbon black enhance the durability and/or resistance to environmental conditions of various compositions provided herein, for example by reducing the coefficient of friction between wiper blade rubbers coated with said compositions and glass surfaces.

In some embodiments, when a wiper glides over the windshield, a water-repelling silicone component present in the coated wiper blade rubbers is transferred to the windshield glass, making the windshield glass water-repellent. However, such water-repellency also contributes to an increase in frictional coefficients, which may result in noise and/or shaking during the wiping action of the wiper. Thus, in order to prevent such undesirable phenomena, graphite or carbon black may be added to compositions provided herein to reduce frictional coefficients.

In various embodiments, compositions provided herein comprise 3.5 to 15 wt % of graphite or carbon black. Without being bound by a particular theory, it is believed that when wiper blade rubbers are coated with compositions comprising graphite or carbon black in amounts outside this range, the wiper blade rubbers do not display, or display to a lesser degree, one or more of the beneficial properties imparted by compositions comprising graphite or carbon black within the disclosed range. For example, in some embodiments, compositions comprising graphite or carbon black in amounts greater than the disclosed range are economically unfavorable.

In some embodiments, compositions provided herein comprise silver. Without being bound by a particular theory, it is believed that silver provides compositions provided herein with antibacterial, germ-killing and/or durability-enhancing activities, and may enhance certain beneficial properties of other components of the compositions.

In various embodiments, compositions provided herein comprise 0.16 and 0.5 wt % of silver. Without being bound by a particular theory, it is believed that when wiper blade rubbers are coated with compositions comprising silver in amounts outside this range, the wiper blade rubbers do not display, or display to a lesser degree, one or more of the beneficial properties imparted by compositions comprising silver within the disclosed range. For example, in some embodiments, compositions comprising silver above the disclosed range are not economically viable.

In various embodiments, compositions provided herein may further comprise one or more of a dispersing agent which can aid an easy preparation and/or quick drying of the composition, a stabilizer, a drying agent, a thickening agent, and/or a defoaming agent. In various embodiments, the one or more additional agents enhance at least one property of the compositions. In some embodiments, compositions provided herein comprise about 0.5 wt % of the dispersing agent and/or the one or more additives.

Wiper blade rubbers useful in the present invention can be general rubbers, including e.g., vulcanized natural rubbers or synthetic rubbers. In some preferred embodiments, the wiper blade rubbers comprise a diene-type rubber or chloroprene rubber. In further preferred embodiments, the diene-type rubber is a natural rubber, butadiene rubber, styrene-butadiene rubber, or EPDM (ethylene propylene diene monomer). In some embodiments, the wiper blade rubbers comprise a silicone rubber.

In further aspects, methods are provided herein for coating a wiper blade rubber with a composition described herein. Also provided are wiper blade rubbers produced by said methods. In some embodiments, methods provided herein comprise a first coating step, wherein the wiper blade rubbers are coated with an intermediate medium to improve water-repellency and/or durability, followed by a second coating step. In some embodiments, the second coating step is preceded by heating of the surface of the wiper blade rubbers, preferably to a temperature at which the rubber surface can expand. The second coating step is then carried out by, for example, a spray coating method.

In various embodiments, compositions provided herein comprise nano-sized particles, which are preferably smaller than those of a conventional coating composition. In order to prepare a coating composition comprising nano-sized particles, each of the coating components are first prepared in a form of particles having a particle size of 50-500 nm, and then dissolved in distilled water as a solvent and/or liquid carrier to provide the coating composition.

In some embodiments, coating with the nano-sized composition described above is carried out by first pre-heating the wiper blade rubbers at temperature of 60-100° C. to expand the rubber surface, and then applying the coating composition, for example by spray-coating. The temperature for said pre-heating can be varied depending on the nature of the rubbers to be treated. The temperature generally corresponds to the temperature at which the rubber surface can be expanded, preferably 80° C. Without being bound by a particular theory, it is believed that pre-heating before spraying nano-sized particles enhances penetration of the coating components to the inside of the rubber, in addition to the rubber surface, whereas conventional methods coat only the outer surface. Advantageously, the compositions and methods provided herein result in wiper blade rubbers having one or more beneficial properties relative to wiper blade rubbers made with known methods.

The wiper blade rubbers of the present invention can be produced in accordance with any conventional methods. In certain embodiments, wiper blade rubbers are produced by means of coextrusion of diene-elastic rubber and chloroprene-elastic rubber. In such case, an unvulcanized strip having a pre-determined cross-sectional form is preferably produced first. The wiper blade rubbers are then preferably subjected to a vulcanization treatment and, if necessary, to a chloride treatment using hypochlorite salt or trichlorocyanuric acid.

In certain embodiments, coating compositions provided herein simultaneously comprise graphite or carbon black and silicone components. In various embodiments, such compositions can be made using a single-coat system, by which dual effects of a graphite coating and a subsequent silicone coating can be obtained, or a two-coat system wherein a treatment with a primer is first carried out followed by a high-level coating to avoid durability problems originating from weak adhesiveness of certain components.

Windshield wiper blades coated with Teflon®-based compositions provided herein generally have excellent wiping properties and a relatively low friction coefficient. Thus, car noise and chattering caused by wiper motion is preferably reduced. To help confirm such effects, coating compositions have been prepared in the following examples and subjected to a wiping ability test, a test for measuring water-repellency, and a test for measuring frictional forces.

The present invention is further defined in the following Examples, in which all parts and percentages are by weight, unless otherwise stated. It should be understood that these examples, while indicating preferred embodiments of the invention, are given by way of illustration only. From the above discussion and these examples, one skilled in the art can ascertain the essential characteristics of this invention, and without departing from the spirit and scope thereof, can make various changes and modifications of the invention to adapt it to various usages and conditions. Herein below, the preparation of the coating composition and the coating process using the same are briefly explained in view of specific examples.

Example 1

The following components are added to distilled water serving as a solvent and/or liquid carrier: 25 wt % of Telfon® polymer, 25 wt % of urethane resin, 1 wt % of silicone resin, 1 wt % of carbon black, 2 wt % of silver and the remaining weight percentage of coating additives. The Teflon® used in this example has a particle size of about 300 nm, and other components have a particle size of about 400 nm.

Figure 2:
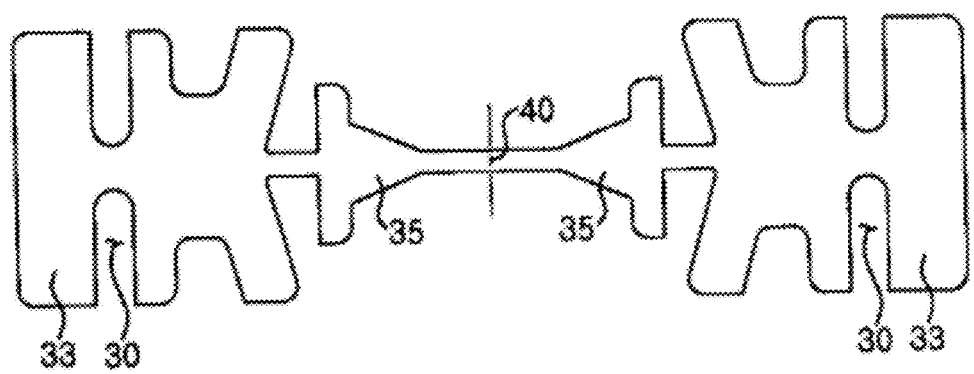
FIG. 2 shows a cross-section of two wiper blade rubbers of the present invention, each having a single integrated body comprising a head portion with an external spring rail and a wedge portion contacting the surface of the windshield glass, in which the wiper blade rubbers are loosely connected and facing each other via the connection.

FIG. 1 shows a cross-section of conventional wiper blade rubbers in which a head portion (13) having an internal spring rail (10) is coupled to a wedge portion (15) contacting the surface of a windshield glass pane via flexing bridge (17). FIG. 2 shows a cross-section of two wiper blade rubbers of the present invention, each comprising, in an integrated body, a head portion (33) with an external spring rail (30) and a wedge portion (35) contacting the surface of the windshield glass, wherein the wiper blade rubbers are loosely connected and facing each other via connection (40).

According to the present invention, conventional wiper blade rubbers of FIG. 1 can be coated with a composition of the present invention as described herein. Compositions provided herein can be applied similarly to wiper strips of conventional wiper blades, in which a head portion having an external spring rail is coupled with a wedge portion contacting the surface of a windshield glass via a flexing bridge, or for other wiper blades in which a head portion having an external spring rail is coupled with a wedge portion in an integrated body.

In one aspect of the instant invention, two wiper blade rubbers are first formed as a single molded piece in which they are joined at the middle region, e.g., by connection (40). After forming a slight dent over the connection region (40) of the rubber, instead of making a complete cut, a pre-treatment using an intermediate medium, which facilitates smooth coating of the composition, is carried out. Then, a previously prepared coating composition is applied to the entire surface of the wiper blade rubbers using, for example a spray coating method. Thereafter, a complete cut is made with a knife along the connection region (40) to yield two separate wiper blade rubbers that can be used separately.

Example 2

The following components are added to distilled water serving as a solvent and/or liquid carrier: 18 wt % of Telfon, 20 wt % of urethane resin, 7 wt % of graphite, 2 wt % of silver and the remaining weight percentage of coating additives. The Teflon® used in this example has a particle size of about 300 nm, and other components have a particle size of about 400 nm.

The method for applying the coating composition of Example 2 to wiper blade rubbers can be carried out according to the method provided in above Example 1.

Example 3

The following components are added to distilled water serving as a solvent and/or liquid carrier: 8 wt % of Telfon, 20 wt % of urethane resin, 9 wt % of graphite, 2 wt % of silver and the remaining weight percentage of the coating additives. The Teflon® used in this example has a particle size of about 300 nm, and other components have a particle size of about 400 nm.

The method for applying the coating composition of Example 3 to wiper blade rubbers can be carried out according to the method provided in above Example 1.

Test 1 (Test for Measuring Wiping Ability)

To measure the wiping ability of the wiper blades prepared above, a test apparatus for measuring wiping ability of a wiper blade as prescribed in KS R 3015, RS R 0031 was used and the results were expressed as a wiping score. Specifically, the test method is a sensitivity measurement test in which water is poured over a car windshield and then wipers are operated to evaluate the wiping quality of the wipers (e.g., 10 is the maximum score).

The coating composition prepared in Example 1 was selected for carrying out the test. An 'EF Sonata', which is one of the automobile models manufactured by Hyundai Motor Company, was chosen as a test vehicle. The selected coating composition was applied to said test vehicle and wiping quality was evaluated under simulated weather conditions that included a temperature of 28.3° C. and humidity of 74% (a score of 10 was given to the standard maximum wiping quality). For the non-coated wiper blade rubbers (1-1), experimental results (scores) are given in Table 1. For the coated wiper blade rubbers (1-2), experimental results are given in Table 2.

TABLE 1

(Experimental results before rubber coating)

|      | 1 | 2 | 3 | 4 | 5 | 6 | 7 | 8 | 9 | 10 | 11 | 12 | 13 | 14 | Mean value |
|------|---|---|---|---|---|---|---|---|---|----|----|----|----|----|------------|
| Up   | 6 | 6 | 7 | 6 | 5 | 7 | 5 | 4 | 6 | 6  | 5  | 7  | 6  | 6  | 5.9        |
| Down | 7 | 7 | 7 | 6 | 5 | 6 | 4 | 5 | 5 | 6  | 5  | 5  | 5  | 6  | 5.6        |

TABLE 2

(Experimental results after rubber coating)

|      | 1 | 2 | 3 | 4 | 5 | 6  | 7 | 8 | 9 | 10 | 11 | 12 | 13 | 14 | Mean value |
|------|---|---|---|---|---|----|---|---|---|----|----|----|----|----|------------|
| Up   | 9 | 9 | 9 | 9 | 8 | 10 | 8 | 8 | 9 | 9  | 10 | 9  | 10 | 10 | 9.1        |
| Down | 9 | 9 | 9 | 9 | 9 | 9  | 8 | 8 | 9 | 9  | 10 | 8  | 9  | 10 | 8.9        |

Comparing the results of Table 1 and Table 2, the mean value of the wiping ability for the wiper blade rubbers before rubber coating was 5.9 and 5.6, for the up and down motions of the wiper blades, respectively. On the other hand, the mean value of the wiping ability for the wiper blade rubbers after rubber coating was 9.1 and 8.9, for the up and down motions of the wiper blades, respectively. Therefore, according to the above-described sensitivity evaluation test, it was confirmed that the wiping ability of the wiper blade rubbers after coating is about two times better than that of the wiper blade rubbers before coating.

Test 2 (Test for Measuring Water-Repellent Property of the Coating)

The duration of water-repellent activity (water repellency, %) was measured according to the condition prescribed in the JIS D5710 standard. Water repellency testing for the wiper blade coating was carried out using two different procedures: (1) a wiper blade which had been coated with the coating composition obtained from Example 1 was directly subjected to a water repellency test, or (2) a pretreatment with water-repellent tissue was first carried out, and then a wiper blade was coated with the coating composition obtained from Example 1, and then subjected to a water repellency test. The pre-treatment step involved use of a commercially available tissue for obtaining a water-repelling effect. Since such tissues carry a water-repellent liquid, pre-treatment with such tissues transfers the water-repellent liquid to the windshield glass so that an additional water-repelling effect can be obtained instantaneously.

For a comparative test, a commercially available wiper with a water-repellent coating (manufactured by Carex, Co., described as a 'Commercial product' herein) was used. 'NTP815' represented a product prepared according to the present invention. For the Commercial product, the toxic materials toluene and xylene were used as a solvent and a water-based resin, respectively. On the contrary, for 'NTP815', distilled water and urethane resin were used as a solvent and/or liquid carrier and a water-based resin, respectively, thus making 'NTP815' an environmentally friendly product.

(2-1) Water Repellency Test Without Treatment with a Water-Repellent Tissue

Figure 3:
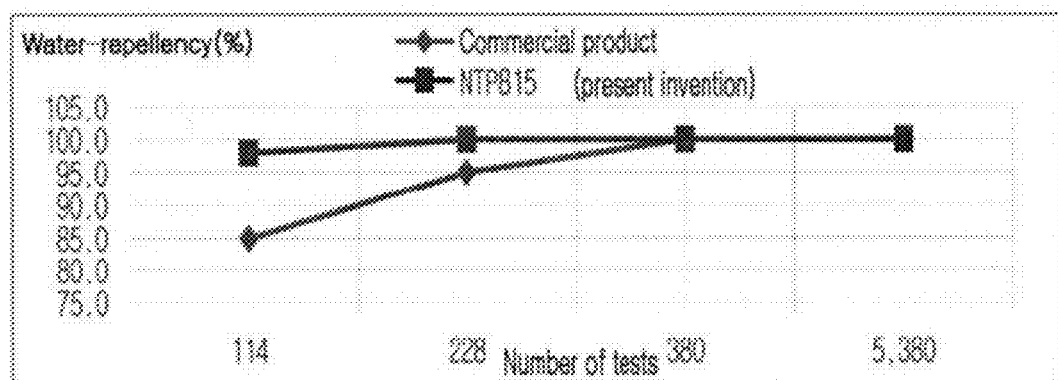
FIG. 3 is a graph showing the results of a water repellency test for a wiper blade without pre-treatment with a water-repellent tissue, with the results expressed in terms of water repellency (%) and number of tests conducted.
Figure 4:
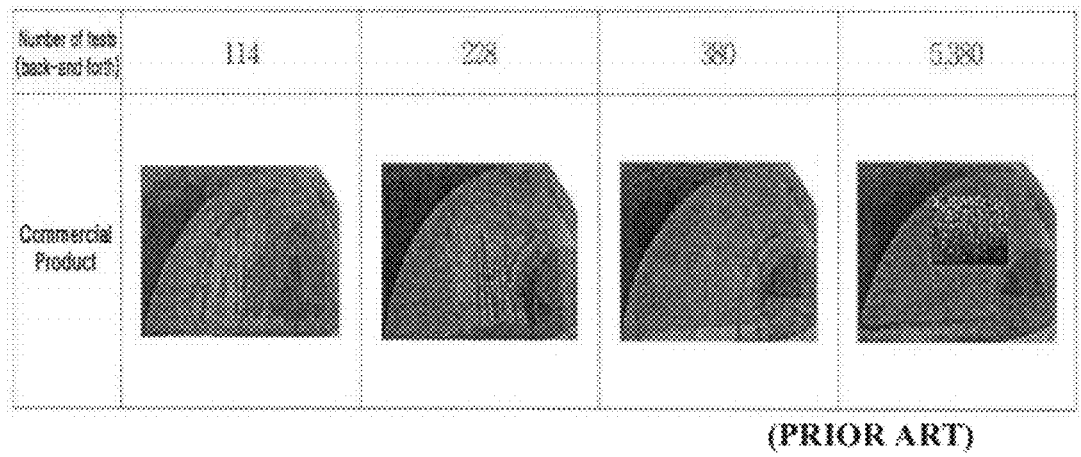
FIG. 4 and FIG. 5 show photographic images of a car windshield glass showing the initial water-repellency of a comparative commercial product and a composition of the present invention (NTP815), after different numbers of back-and-forth wiper motions.
Figure 5:
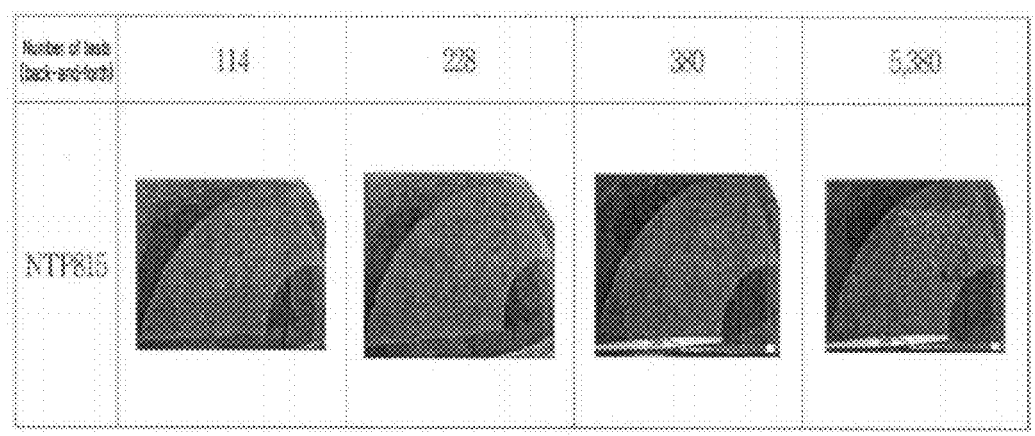

The number of back-and-forth motions of a wiper was set at 114, 228, 380 or 5,380 and the results of a water repellency test for each product were summarized in the following Table 3. FIG. 3 is a graph showing the relationship between water repellency and the number of tests. FIG. 4 and FIG. 5 are photographic images of the test.

TABLE 3

|                    | Water repellency (%) |       |       |       |
|--------------------|------|-------|-------|-------|
| Number of tests    | 114  | 228   | 380   | 5,380 |
| Commercial product | 85.0 | 95.0  | 100.0 | 100.0 |
| NTP815             | 98.0 | 100.0 | 100.0 | 100.0 |

The results of Table 3 reveal that initial water repellency is improved in the product of the present invention compared to the Commercial product, since the water-repellent area was about 12% greater for the product of the present invention than that of the Commercial product, when the initial water repellency test was carried out without pre-treatment with a water-repellent tissue.

(2-2) Water Repellency Test after the Treatment with a Water-Repellent Tissue

Figure 6:
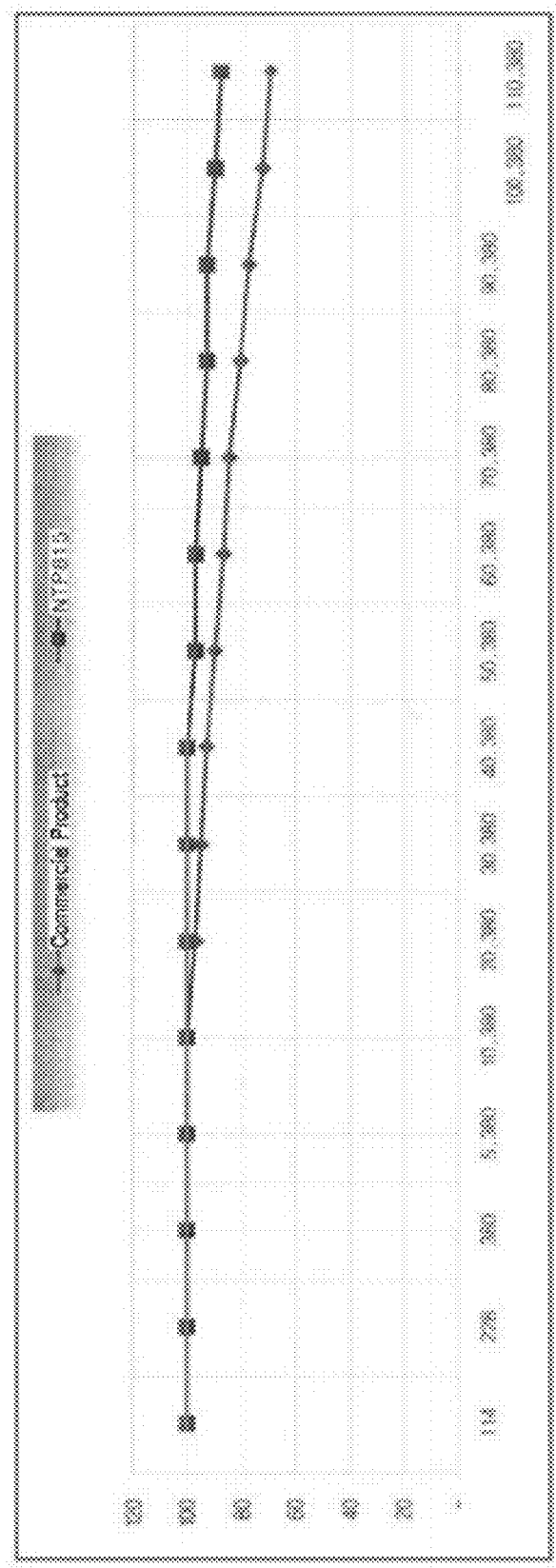
FIG. 6 is a graph showing the results of the water repellency test for a wiper blade pre-treated with a water-repellent tissue, with the results expressed in terms of water repellency (%) and number of tests conducted.
Figure 7:
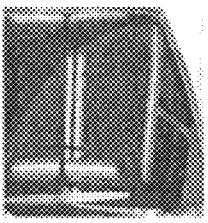
FIG. 7 shows a photographic image of a glass windshield showing the enduring water-repellency of a comparative commercial product after varying numbers of back-and-forth wiper motions.
Figure 8:
FIG. 8 and FIG. 9 show photographic images of a glass windshield showing the enduring water-repellency of a composition of the present invention (NTP815) after varying numbers of back-and-forth wiper motions.
Figure 9:
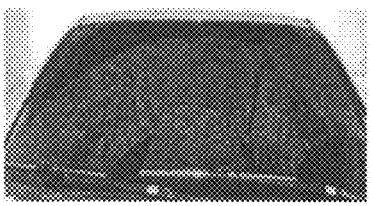

The number of back-and-forth motions of a wiper was set at 15 and the results of a water repellency test were summarized in the following Table 4. FIG. 6 is a graph showing the relationship between water repellency and the number of tests. FIG. 7, FIG. 8 and FIG. 9 are photographic images of the test.

TABLE 4

| Water repellency (%) | | | | | | | |
|---|---|---|---|---|---|---|---|
| Number of tests | | | | | | | |
| | 114 | 228 | 380 | 5,380 | 10,380 | 20,380 | 30,380 | 40,380 |
| Commercial product | 100.0 | 100.0 | 100.0 | 100.0 | 100.0 | 97.0 | 95.0 | 93.0 |
| NTP815 | 100.0 | 100.0 | 100.0 | 100.0 | 100.0 | 100.0 | 100.0 | 100.0 |
| Number of tests | | | | | | | |
| | 50,380 | 60,380 | 70,380 | 80,380 | 90,380 | 100,380 | 110,380 |
| Commercial product | 90.0 | 87.0 | 85.0 | 81.0 | 78.0 | 73.0 | 70.0 |
| NTP815 | 97.0 | 97.0 | 95.0 | 93.0 | 93.0 | 90.0 | 88.0 |

The results of Table 4 reveal that initial water repellency is improved in the product of the present invention compared to the Commercial product, since the enduring water-repellent area is about 18% greater for the product of the present invention compared to that of the Commercial product, when the water repellency test was carried out after pre-treatment with a water-repellent tissue.

Test 3 (Test for Measuring Frictional Force)

Frictional force was measured by monitoring electric currents that are related to the degree of frictional force. A resistance value which is used herein as an index of frictional forces does not represent a quantitative resistance value, but rather an index for comparing frictional forces among different wiper blade rubbers. When a windshield wiper is running, a constant amount of voltage is maintained while an electric current constantly changes. Thus, the present test is based on the principle that, if less friction occurs on the surface of a windshield glass, less electric current will flow, whereas if more friction occurs on the surface of a windshield glass, more electric current will flow.

Figure 10:
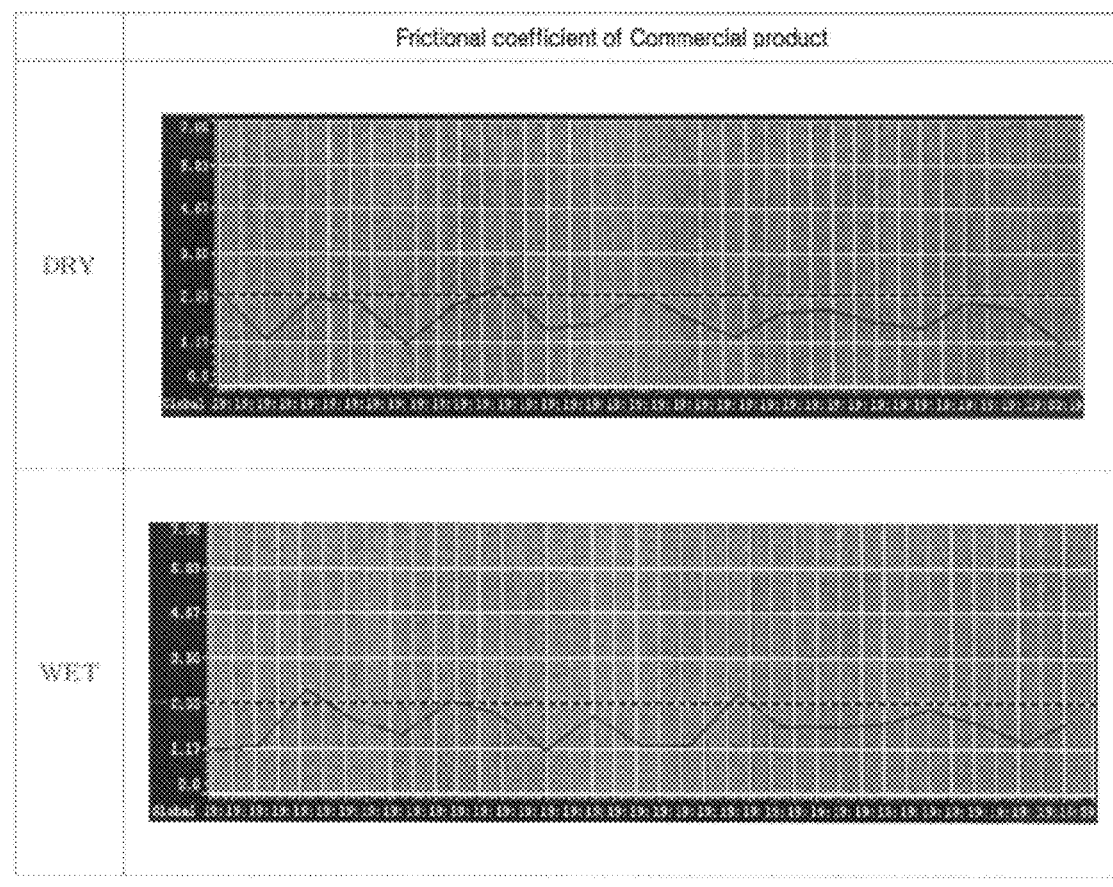
FIG. 10 is a graph showing the frictional coefficient of a comparative commercial product without pre-treatment with a water-repellent tissue, measured under dry (upper) or wet (lower) conditions.
Figure 11:
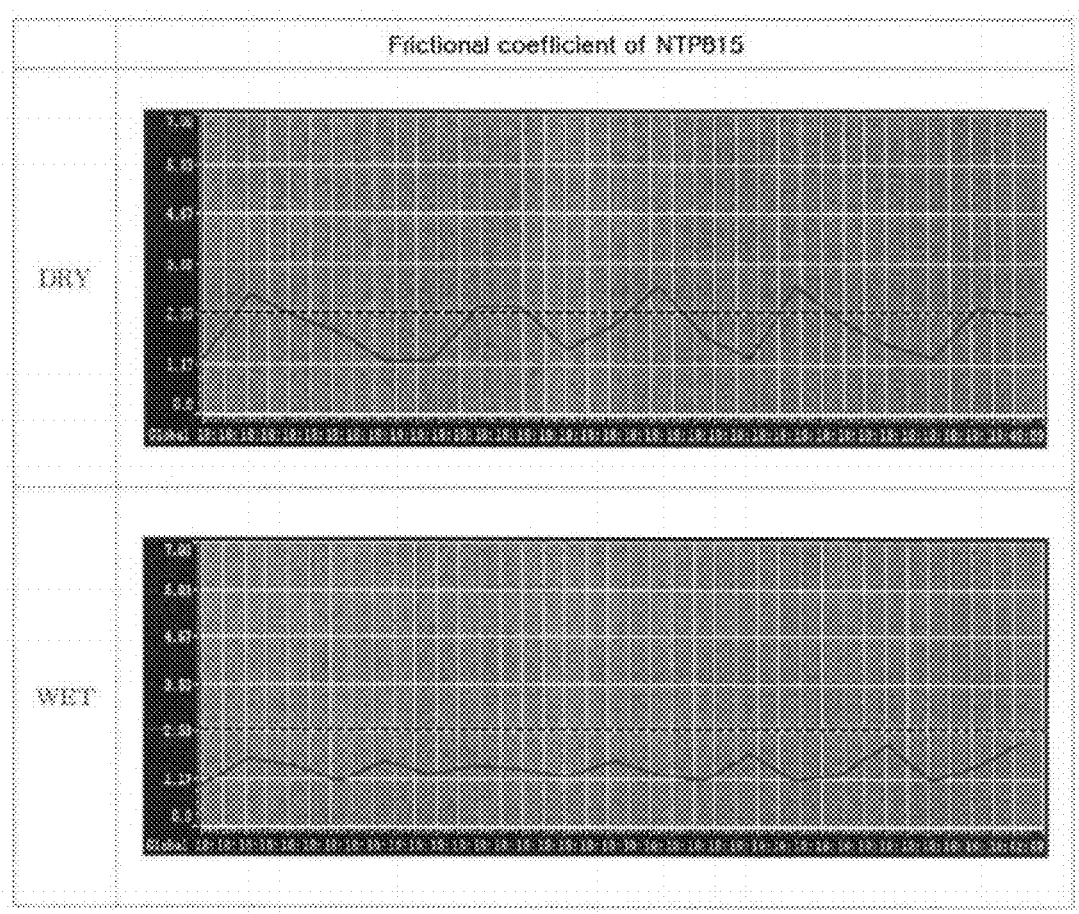
FIG. 11 is a graph showing a frictional coefficient of a composition of the present invention (NTP815) without pre-treatment with a water-repellent tissue, measured under dry (upper) or wet (lower) conditions.

Frictional coefficients were measured for a product of the present invention (NTP815) and a comparative product (Commercial product) under dry and wet conditions, without pre-treatment with a water-repellent tissue for the initial water-repellency test. The results are summarized in FIG. 10 (dry) and FIG. 11 (wet).

For the comparative product, the frictional coefficient was (1) 1.17~2.5 A under the dry state, and (2) 1.17~2.5 A under the wet state. For the product of the present invention, the frictional coefficient was (1) 1.19~2.7 A under the dry state, and (2) 1.17~2.0 A under the wet state. Considering that frictional coefficients themselves are not taken as a quantitative value, but as an index to compare relative frictional forces (by comparing the amounts of electric current), the product of the present invention showed higher electric current relative to the comparative commercial product. Thus, it was confirmed that the product of the present invention has better resistance to frictional forces than the comparative commercial product.

Moreover, similar results were obtained from tests using coating compositions prepared according to Example 2 and Example 3 (data not shown).

When ranges are used herein for physical properties, such as molecular weight, or chemical properties, such as chemical formulae, all combinations and sub-combinations of ranges specific embodiments therein are intended to be included.

The disclosures of each patent, patent application, and publication cited or described in this document are hereby incorporated herein by reference, in their entirety.

Those skilled in the art will appreciate that numerous changes and modifications can be made to the preferred embodiments of the invention and that such changes and modifications can be made without departing from the spirit of the invention. It is, therefore, intended that the appended claims cover all such equivalent variations as fall within the true spirit and scope of the invention.

What is claimed:

1. A coating composition comprising:
   3.5 to 15 total wt % of polytetrafluoroethylene (PTFE) particles;
   3.2 to 9.6 total wt % of polyurethane particles; and
   1.6 to 6.0 total wt % of polyhydromonomethylsiloxane oil or resin particles;
   in the presence of at least one solvent and/or liquid carrier, wherein all of said particles are present in the solvent and/or liquid carrier with a mean particle size of about 50 to 500 nm.

2. The coating composition according to claim 1, further comprising 5.0 to 25.0 total wt % of a thermosetting water-based urethane resin.

3. The coating composition according to claim 1, further comprising graphite or carbon black having a mean particle size of about 50 to 500 nm.

4. The coating composition according to claim 3, wherein said graphite or said carbon black is present at about 3.5 to 15 wt %, based on the total weight of the coating composition.

5. The coating composition according to claim 3, further comprising silver having a mean particle size of about 50 to 500 nm.

6. The coating composition according to claim 5, wherein said graphite or said carbon black is present at about 3.5 to 15 wt %, and said silver is present at about 0.16 to 0.5 wt %, based on the total weight of the coating composition.

7. The coating composition according to claim 1, further comprising silver particles having a mean particle size of about 50 to 500 nm.

8. The coating composition according to claim 7, wherein said silver particles are present at about 0.16 to 0.5 wt %, based on the total weight of the coating composition.

9. The coating composition according to claim 1, wherein said PTFE particles are present at about 7 to 8 wt %, and said polyhydromonomethylsiloxane oil or resin particles are present at about 2 to 3 wt %, based on the total weight of the coating composition.

10. The coating composition according to claim 1, wherein said PTFE particles have a particle size of about 250-350 nm, and said polyurethane particles and said polyhydromonomethylsiloxane oil or resin particles have a mean particle size of about 400 nm.

11. The coating composition according to claim 1, wherein said liquid carrier is distilled water.

12. A method for treating the surface of a wiper blade, comprising coating a wiper blade rubber with a coating composition of claim 1.

13. The method of claim 12, wherein said wiper blade rubber comprises natural rubber, butadiene rubber, styrene-butadiene rubber, EPDM rubber, chloroprene rubber, silicone rubber, or a combination thereof.

14. The method of claim 12, wherein said coating step comprises spraying said composition on said wiper blade rubber.

15. The method of claim 14, further comprising the step of heating said wiper blade rubber to a temperature of about 60 to 100° C.

16. The method of claim 12, further comprising the step of pre-treating said surface with a primer prior to said coating step.

17. A wiper blade made according to the method of claim 12.

18. An article comprising a substrate coated with the coating composition of claim 1.

* * * * *